(No Model.)

W. T. CARROLL.
SELF LUBRICATING PULLEY.

No. 376,633. Patented Jan. 17, 1888.

Witnesses
Chas. F. Schmelz
Clarence W. Dickinson

Inventor
William T. Carroll,
By his Attorney
John C. Dewey

UNITED STATES PATENT OFFICE.

WILLIAM T. CARROLL, OF WORCESTER, MASSACHUSETTS.

SELF-LUBRICATING PULLEY.

SPECIFICATION forming part of Letters Patent No. 376,633, dated January 17, 1888.

Application filed July 28, 1887. Serial No. 245,485. (No model.)

*To all whom it may concern:*

Be it known that I, WILLIAM T. CARROLL, a citizen of the United States, residing at Worcester, in the county of Worcester and State of Massachusetts, have invented certain new and useful Improvements in Lubricating-Pulleys; and I do hereby declare that the following is a full, clear, and exact description thereof, which, in connection with the drawings making a part of this specification, will enable others skilled in the art to which my invention belongs to make and use the same.

My invention relates to a self-lubricating pulley or wheel, and to that class which is provided with a chamber or receptacle within the hub, extending around the bearing, for containing the lubricant, and which chamber is in direct communication with the bearing of the pulley or wheel, so that the same shall automatically lubricate its bearings.

The object of my invention is to produce a self-lubricating pulley or wheel provided with a chamber to hold a large quantity of lubricant, which will be regularly and evenly applied to the bearing of the pulley by means contained within said chamber without any waste, and at the same time the bearing will be kept even and smooth and will not become gummed up by reason of the lubricant constantly being in contact therewith.

My invention consists in certain novel features of construction of a loose pulley or wheel of the class described rotating on a shaft or axle, as will be hereinafter fully described, and the nature indicated by the claim.

Figure 2:
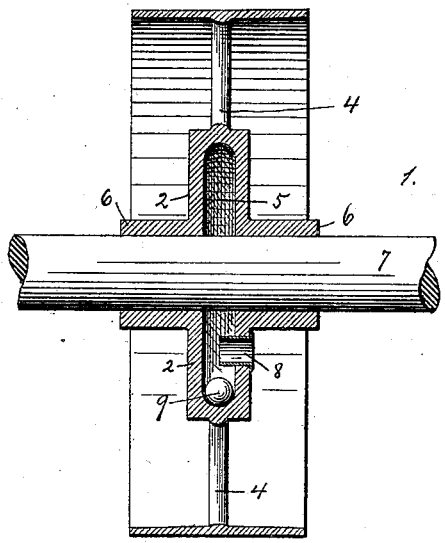
Figure 1:
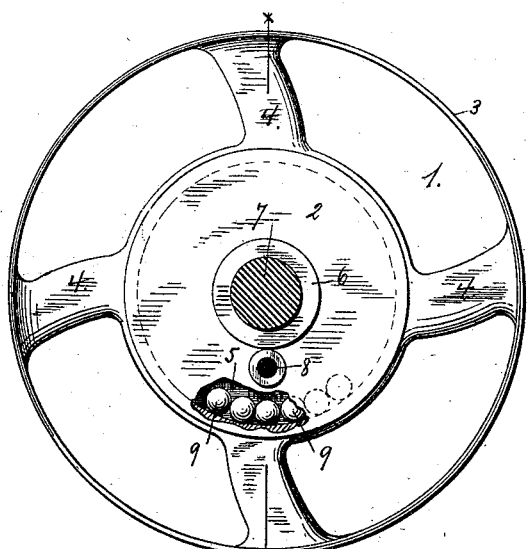

Referring to the drawings, Figure 1 is a side elevation of a pulley embodying my improvements mounted on a shaft, with a part broken away to illustrate the interior construction and arrangement thereof. Fig. 2 is a central vertical section on line *x x*, Fig. 1, looking in the direction of the arrow, same figure.

In the accompanying drawings, 1 is a pulley or wheel of my improved construction, preferably cast in one piece, with the central portion, 2, and rim 3 connected by the arms 4. The central portion, 2, is made hollow, and has an annular chamber, 5, formed therein, extending completely around the hub 6 of the pulley or wheel and in direct communication with the bearing of the pulley or the shaft or axle 7, extending through the hub 6. (See Fig. 2.) The open end or mouth of the annular chamber 5, which extends around and is in direct communication with the shaft 7, is of the same diameter as the diameter of the chamber 5 itself. (See Fig. 2.)

The annular chamber 5 within the central portion, 2, of the pulley contains the lubricant, which is inserted through a tube, 8, extending through and secured in a hole made through one side of the central portion, 2, of the pulley close to the hub 6. (See Fig. 2.) Said tube 8 may have a plug or stopper fitted into its outer end to prevent any escape of the lubricant from the chamber 5.

Within the annular chamber 5 are a number of balls, 9, adapted to roll loosely around therein and to come in direct contact with the shaft 7, upon which the pulley revolves, and to apply the lubricant contained within the chamber 5 directly to said shaft or the bearing of the pulley by coming in contact therewith.

It will thus be seen that as the pulley 1 revolves on its shaft the balls 9, contained within the lubricant-chamber 5, as above described, will be carried around with the pulley and at every revolution thereof pass through the lubricant in the lower part of said chamber, and be carried above the shaft upon which the pulley is mounted and drop down on said shaft, coming in direct contact therewith, and thus applying thereto the lubricant, with which they are charged.

It will be understood that the balls 9 are placed within the chamber 5 by inserting them through the hub 6 of the pulley before the same is mounted on its bearing, and prevented from dropping or coming out of said chamber 5 by the shaft 7, extending through the hub 6 of the pulley.

The advantages of my improved construction of a lubricating pulley or wheel will be apparent to those skilled in the art. When the pulley or wheel is at rest, the lubricant and balls 9 remain in the lower part of the chamber 5 out of contact with the bearing of the pulley. When the pulley revolves, the lubricant contained within the chamber 5 will not be in direct contact with the bearing of the pulley, but will be regularly and evenly applied thereto at every revolution of the pulley or wheel or when the pulley stops by means of the balls 9, which are contained within the chamber 5 and come in direct contact with said bearing of the pulley.

I have shown in the drawings and more especially described my invention as applied to a loose pulley mounted on a shaft; but the same may be equally well applied and used in connection with wheels mounted and turning on axles.

Having thus described my invention, what I claim as new, and desire to secure by Letters Patent, is—

A lubricating pulley or wheel having an annular chamber for holding the lubricant within the hub and in direct communication with the bearing thereof, the open end of said chamber surrounding the bearing being of the same diameter as the chamber itself and provided with one or more balls to come in direct contact with the bearing of the pulley to apply the lubricant thereto, substantially as shown and described.

WILLIAM T. CARROLL.

Witnesses:
JOHN C. DEWEY,
M. RALPH DRYDEN.